United States Patent
Maymir-Ducharme et al.

(10) Patent No.: US 7,822,768 B2
(45) Date of Patent: Oct. 26, 2010

(54) SYSTEM AND METHOD FOR AUTOMATING DATA NORMALIZATION USING TEXT ANALYTICS

(75) Inventors: Fred A. Maymir-Ducharme, Potomac, MD (US); Michael Hehenberger, Westport, CT (US)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 10/995,575

(22) Filed: Nov. 23, 2004

(65) Prior Publication Data

US 2006/0112110 A1   May 25, 2006

(51) Int. Cl.
G06F 7/00 (2006.01)
(52) U.S. Cl. .................................... 707/776
(58) Field of Classification Search .............. 707/102, 707/776
See application file for complete search history.

(56) References Cited

U.S. PATENT DOCUMENTS

| | | | |
|---|---|---|---|
| 6,208,990 B1 | 3/2001 | Suresh et al. | |
| 6,505,197 B1 | 1/2003 | Sundaresan et al. | |
| 2002/0038306 A1 | 3/2002 | Griffin et al. | |
| 2002/0144233 A1 | 10/2002 | Chong et al. | |
| 2003/0084142 A1 | 5/2003 | Casati et al. | |
| 2003/0115080 A1 | 6/2003 | Kasravi et al. | |
| 2003/0120504 A1 | 6/2003 | Kruk et al. | |
| 2003/0126136 A1* | 7/2003 | Omoigui | 707/10 |
| 2003/0130991 A1 | 7/2003 | Reijerse et al. | |
| 2003/0177143 A1 | 9/2003 | Gardner et al. | |
| 2003/0177481 A1 | 9/2003 | Amaru et al. | |

OTHER PUBLICATIONS

Landau et al., "TextVis: An Integrated Visual Environment for Text Mining", In: Proceedings of the $2^{nd}$ European Symposium on Principles of Data Mining and Knowledge Discovery, Nantes, France. 1998.
Wong et al., "Visualizing Sequential Patterns for Text Mining", Date Unknown.

* cited by examiner

*Primary Examiner*—Apu M Mofiz
*Assistant Examiner*—Ajith Jacob
(74) *Attorney, Agent, or Firm*—Douglas Lashmit; Hoffman Warnick LLC

(57) ABSTRACT

A system, method and program product for normalizing, sanitizing and disambiguating structured data. Structured data includes data stored in a database management system (DBMA), as well labeled files (e.g., XML data). An automated data enhancement processing system is provided, comprising: a system for ingesting data structured in at least one predefined database format; and a set of text analytics processes that treat the ingested data as unstructured, and generate normalized data represented and indexed by consistent, structured metadata.

19 Claims, 2 Drawing Sheets

SYSTEM AND METHOD FOR AUTOMATING DATA NORMALIZATION USING TEXT ANALYTICS

BACKGROUND OF THE INVENTION

1. Technical Field

The present invention relates generally to database normalization, online analytical processing and data mining. More specifically, it relates to a system and method for applying search and text analytics and text mining technology to automate and optimize data normalization for data mining and business intelligence applications.

2. Related Art

Almost all industries recognize the value of mining data from databases of electronic information. One of the critical challenges in the field of data mining involves providing high quality data. Often, an entity may have data stored in multiple databases, which store data in different formats, different naming conventions, and for different purposes. Thus, the relevant input data to be mined typically comes from numerous database management systems (DBMS's) that were created over the years, by different people, different organizations, using non-uniform values, names, schemas, platforms, database tools, etc. For example, a company that merges with another company to increase its customer base or provided services immediately faces the need to extend the aggregate of its business processes across the composite of the data from both companies. In order to effectively exploit the data in each of the databases, the data needs to be "normalized" into a common format, sanitized to eliminate errors, and disambiguated to eliminate redundancies, anomalies, polysemi (i.e., a word that has two or more meanings which are more or less "related" in accordance with some general principle), etc.

Traditionally, 70-80% of the costs associated with undertaking a large data mining program are associated with the tremendous effort required to sanitize, normalize and disambiguate the data before the mining heuristics can be applied and exploited. The quality of the data being mined (i.e., the input) directly affects the quality of the mining results (e.g., categorizations, predictions, trend analyses, etc.). Accordingly, without effectively "normalizing" the data that is going to the mined, there is little value in mining the data and, without an efficient solution, the costs are prohibitive.

Currently, normalization is accomplished using ETL (extract, translate and load) tools that rely on manually developing point-to-point (database to data warehouse) translations—requiring deep insight and analysis into each database being ETL'ed—as well as a full understanding of the existing and future applications processing the data. Thus, implementing ETL tools is an expensive and time consuming process that requires a substantial amount of manual intervention. Frequently, the ETL process must be repeated to support new or modified business processes and applications.

A second major challenge involves the fact that companies are often dealing with very large volumes of data. Many systems today can apply ETL and Data Mining technology to Gigabyte ($10^9$) and Terabyte ($10^{12}$) databases, but they cannot effectively support Petabyte ($10^{15}$) or Exabyte ($10^{18}$) systems. As data volumes are growing at extremely high rates, organizations are experiencing difficulties managing their data, let alone provide easy access to users, and exploit (i.e., mine) them effectively and efficiently.

Accordingly, a need exists for an automated system for normalizing data, so that the data can be queried and mined.

SUMMARY OF THE INVENTION

The present invention addresses the above-mentioned problems, as well as others, by providing an automated data enhancement processing system and method that treats inputted database data as unstructured data and utilizes text analytics to generate normalized, sanitized and disambiguated data that is stored using consistent, structured metadata suitable for data mining and OLAP (online analytical processing) applications. The system and method allow disparate sets of database data to be normalized in an automated fashion with little or no manual intervention.

In a first aspect, the invention provides an automated data enhancement processing system for processing database data, comprising: a system for ingesting data structured in at least one predefined format; and a set of text analytics processes that treat the ingested data as unstructured to generate normalized data represented by consistent and structured metadata.

In a second aspect, the invention provides a program product stored on a recordable medium, which when executed by a computer, normalizes database data representation and metadata, comprising: program code configured for ingesting data structured in at least one predefined database format; and program code providing a set of text analytics processes that treats the ingested data as unstructured, and generates normalized data represented by a consistent and structured metadata.

In a third aspect, the invention provides a method for normalizing database data, comprising: ingesting data structured in at least one predefined database format; and performing a set of text analytics processes on the ingested data to generate normalized data represented by a consistent and structured metadata, wherein each of the text analytics processes treat the ingested data as unstructured.

In a fourth aspect, the invention provides a method for deploying an automated data enhancement processing system for normalizing database data, comprising: providing a computer infrastructure being operable to: ingest data structured in at least one predefined database format; and perform a set of text analytics processes on the ingested data to generate normalized data represented by a consistent, indexed and structured metadata, wherein each of the text analytics processes treat the ingested data as unstructured.

As described below, the invention applies a series of text analytics, relevancy ranking heuristics, natural language processing techniques, indexing and classification models to effectively store, sanitize and normalize the resulting data.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
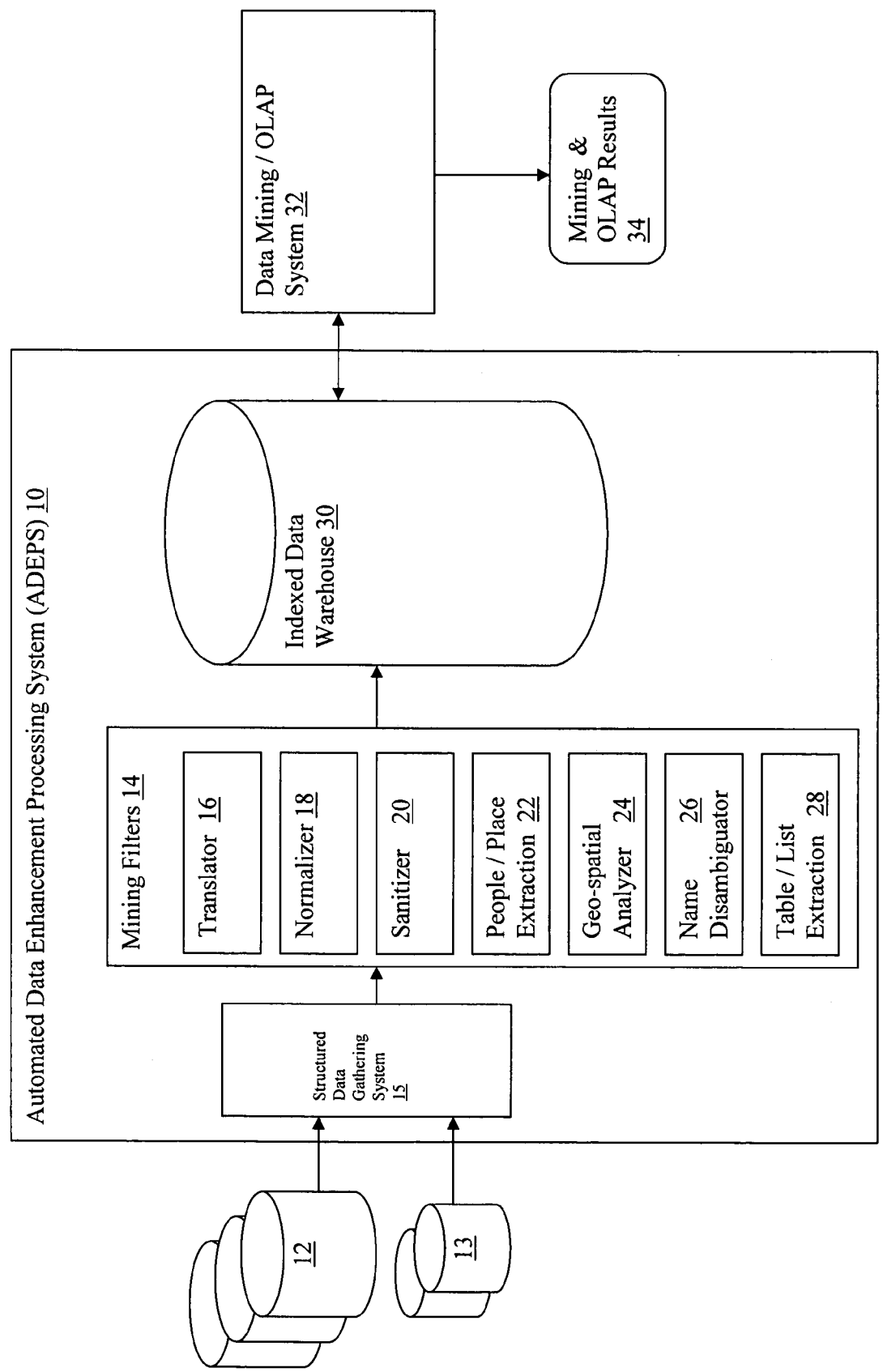
FIG. 1 depicts an automated data enhancement processing system in accordance with the present invention.

The present invention essentially treats structured database data as "unstructured" data, and applies one or more automated text analysis technologies (referred to herein as "mining-filters") to sanitize, normalize and disambiguate the data. Structured data may be generally defined as elements of relational databases representing (numeric) values of well defined entities such as birth dates, social security numbers, bank account balances, etc.—as well as alpha-numeric values such as name, occupation, marital status, etc. Structured elements of a database may also be represented (i.e., labeled) in XML, (extensible markup language). Structured data may also include BLOBs (binary large objects). For example, a database of journal articles may define attributes such as author, title, publication date, etc.; but then include the entire text of the article under the "body" attribute (i.e., as a single data element). Accordingly, for the purpose of this disclosure, structured data is data that is structured in at least one predefined database or labeled format.

Unstructured data may be defined as free text or image data that are not "structured" in the way explained above. However, unstructured data such as free text documents can be transformed into structured data by extracting "fields" such as "Author," "Date of Publication," "References," and names, locations, etc. Unstructured data (e.g., published articles, corporate reports, business communications, BLOGS (web logs), e-mail logs, web pages, meeting notes, etc.) are typically stored in files (e.g., Microsoft Word, Lotus Freelance, ".txt files" etc.).

The present invention utilizes text analytics tools designed for unstructured data to deal with structured data. This result is a superset of data (i.e., data and metadata within a data warehouse) that includes consistently represented, labeled, structured metadata that describes, stores and indexes the inputted data, so it can be better exploited (e.g., mined, queried, etc.). Furthermore, the end result of applying these "mining-filters" is computationally equivalent to the structured data used by traditional DBMS-based data mining technology, as well as unstructured search and text analytics technology (e.g., entity-relationship modeling and viewers). Moreover, using text analytics in this manner provides resulting data that is of a higher quality and flexibility than traditional ETL results.

As described below, automated mining-filters can be utilized for sanitizing (e.g., addressing misspellings, ranges, redundancies, etc.), normalizing (e.g., thesaurus, morphological derivatives, temporal or economic equivalence, etc.), disambiguating (e.g., names, most recent info, etc.), categorizing (auto taxonomy generation, auto foldering, affinities discoveries, etc.), indexing, tabularizing, etc.

There are many advantages to this approach. The first advantage is that all of the resulting data has been processed (i.e., translated and expanded) into a consistent structure—which is ready for mining and OLAP applications. These mining-filters can be implemented or configured with various search and text analysis heuristics so the resulting data schema for the resulting data warehouse is dynamically derived, rather than predefined. With ETL tools, if the data schema designed for the resulting data warehouse is not designed correctly (i.e., supporting required mining attributes and values), all of the individual database-to-data warehouse "ETL" translation rules need to be re-defined and re-processed. Furthermore, if the data mining or OLAP data warehouse schema needs to change in order to support new business processes, the ETL solution basically requires "starting from scratch," whereas the results of this invention can be tailored or configured to meet new requirements with minimum effort. Additionally, search and text analytics (which we refer to as "mining filters") have more capabilities than the traditional ETL tools. Mining filters can use both implicit and explicit data from the data being filtered; and mining-filters can also use some of the results (metadata) from other mining-filters to better sanitize, normalize, disambiguate, and translate data.

Referring now to the drawings, FIG. 1 depicts an automated data enhancement processing system (ADEPS) 10 that receives structured data from one or more databases 12, 13, and applies one or more notional text analytics processes (i.e., mining filters 14) to create an indexed data warehouse 30 of consistent, structured metadata for describing the inputted data. Data from indexed data warehouse 30 can then be processed or mined using a traditional data mining/OLAP system 32 to generate mining and OLAP results 34.

Databases 12, 13 may include data stored in different database format/schemas using different database management systems (DBMS). For example, in the healthcare field, an entity may utilize a first database for providing medical treatments (e.g., SNOMED), a second database for medical research (e.g., UMLS/MESH), and a third database for FDA regulated clinical trials (e.g., MeDRA). In this example, each database contains structured data, but each stores the data in a disparate format. Structured data gathering system 15 includes a system for identifying and ingesting the data from each database 12, 13. Systems for ingesting data in different database formats are known in the art. For instance, IBM's INFORMATION INTEGRATOR™ supports interfaces for ingesting data from most database platforms—as well as labeled flat files (e.g., XML).

Once ingested, the data is passed through one or more mining filters 14. Each mining filter 14 includes a text analytics system that analyzes the ingested data as if the data were unstructured data. In particular, the ingested data is textually analyzed using now known or later developed text analytics processes to generate a consistent, structured metadata that can be used to describe the ingested data. (Note that for the purposes of this disclosure, the phrase "text analytics processes" includes search processes.) Specifically, the mining filters 14 may be utilized to sanitize, normalize, disambiguate, etc., the ingested data. The types of mining filters 14 applied will depend on the desired OLAP or mining goals.

Known text analytics systems include, e.g., those technologies utilized by IBM's WEB FOUNTAIN™ and provided in IBM's SW products Languageware and DB2 II/Omnifind; natural language processing tools; entity extractors for extracting place, date, location, and person information; polymorphism analysis tools that identify different versions and tenses of words; linguistic analysis tools that identify synonyms, antonyms, rankings, proximity, etc.; language translation tools; tools that categorize; etc.

In the illustrative embodiment shown in FIG. 1, various mining filters 14 are shown, including a translator 16 to, e.g., translate; a normalizer 18 to, e.g., convert data to a consistent format; a sanitizor 20 to, e.g., address misspelling and other errors; people/place extraction 22 to, e.g., identify names of people and places; geo-spatial analyzer 24 to, e.g., analyze spatial relationships; name disambiguator 26 to, e.g., address ambiguities; table/list extraction 28 to, e.g., identify tables and lists and extract the data.

Note that the example shown in FIG. 1 is simplified in order to notionally describe the system functionally. Each of these high level filters (e.g., sanitizer 20) may in fact be composed of numerous, shared, low level filters such as: entity tokenizers, translating, people extracting, place extracting, entity type extracting, name tokenizing, organization tokenizing, relevancy ranking, polysemi filtering, geo-spatial analyzing, table/list extracting, etc. Language processes may include parts-of-speech tagging, polymorphical analyzing, thesaurus matching, and statistical machine translation matching. A feature of the data mining filters 14 is that they do not need to know anything about the structure of the inputted data. The only requirement is that they all utilize a shared set of metadata tags to represent the data stored in the data warehouse.

In general, ADEPS 10 can be implemented in any type of computer system, e.g., a mainframe, a server, a client, desktop, a laptop, a workstation, etc. Such a computer system may include a processing unit, memory, a bus, input/output (I/O) interfaces, external devices/resources and storage. The processing unit may comprise a single processing unit, or be distributed across one or more processing units in one or more locations, e.g., on a client and server. Memory may comprise any known type of data storage and/or transmission media, including magnetic media, optical media, random access memory (RAM), read-only memory (ROM), a data cache, a data object, etc. Moreover, any memory may reside at a single physical location, comprising one or more types of data storage, or be distributed across a plurality of physical systems in various forms.

I/O interfaces may comprise any system for exchanging information to/from an external resource. External devices/resources may comprise any known type of external device, including data storage, hand-held device, keyboard, mouse, voice recognition system, speech output system, printer, monitor/display, facsimile, pager, etc. A bus may be included to provide a communication link between each of the components in the computer system and likewise may comprise any known type of transmission link, including electrical, optical, wireless, etc. Additional components, such as cache memory, communication systems, system software, etc., may be incorporated into computer system.

Databases 12, 13 and indexed data warehouse 30 may be embodied in any type of storage system (e.g., a relational database, etc.) and may include one or more storage devices, such as RAM, ROM, a magnetic disk drive and/or an optical disk drive. Data storage can also be distributed across, for example, a local area network (LAN), wide area network (WAN) or a storage area network (SAN) (not shown). Thus, indexed data warehouse 30 could have some or all of its data stored remotely over a distributed network, thereby allowing for the pooling of resources and information.

Such a network could be any type of network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system comprising ADEPS 10 could be created, maintained and/or deployed by a service provider that offers the functions described herein for customers. That is, a service provider could offer data processing services to perform the functions described above.

Figure 2:
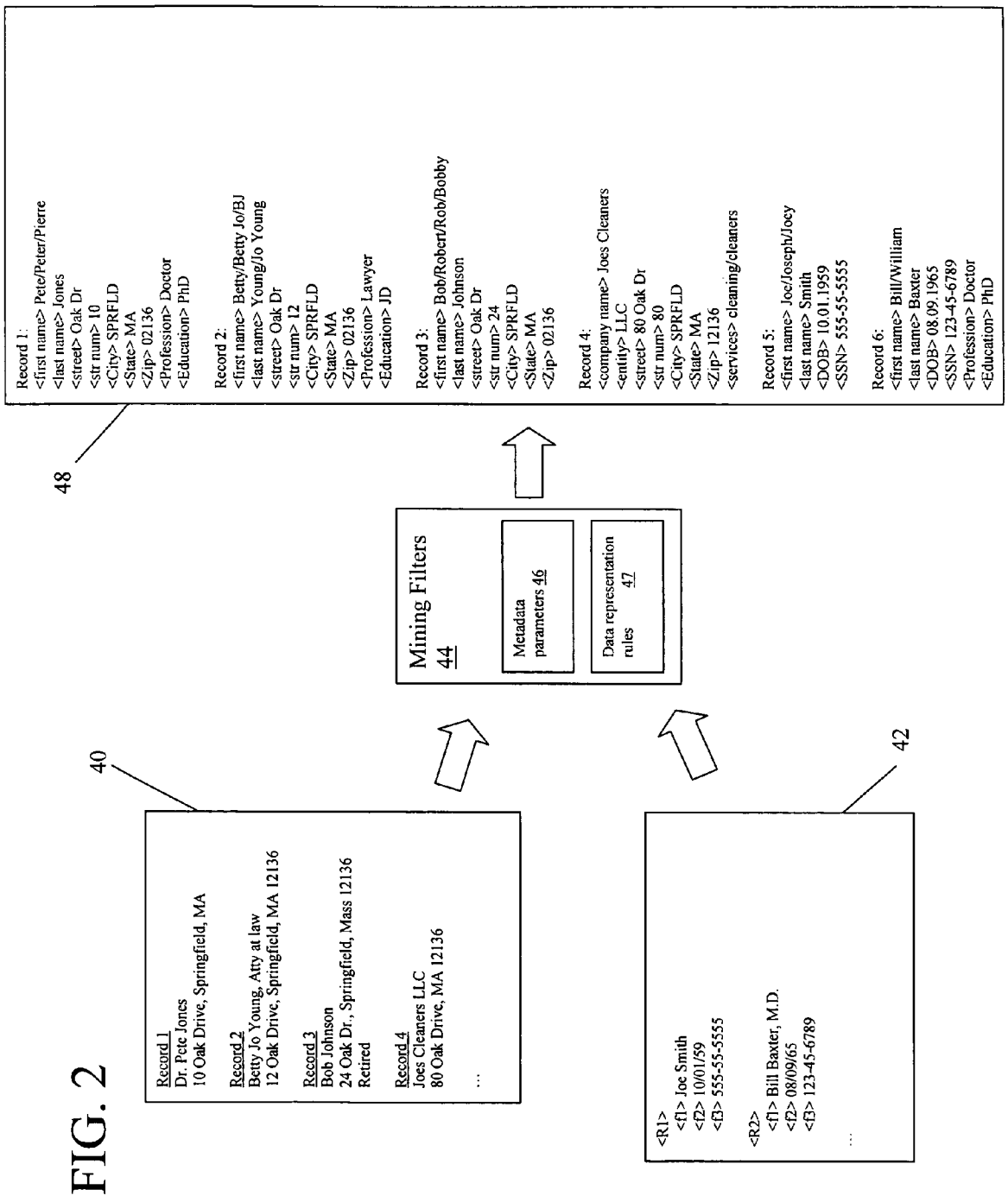
FIG. 2 depicts an illustrative text analytics process in accordance with the present invention.

Referring now to FIG. 2, an illustrative text analytics process is shown processing a first set of data 40 ingested from a first database and then a second set of data 42 ingested from a second disparate database. Both sets of data 40, 42 are fed into one or more mining filter(s) 44. Mining filters 44 include metadata parameters 46 that dictate the set of metadata tags that can be used to create a normalized data set (e.g., <State> to specify a state) and data representation rules 47 that dictate allowable formats for the resulting normalized data set (e.g., "MA" versus "Mass" to represent Massachusetts).

The mining filters will have created numerous labels for each data element. For example, the data element "MA" may have the following associated labels after being processed by a language filter, an entity type extractor filter, and a GIS filter: <language: English>, <address: state field>, <entity type: location>, <token: "East Coast">, <token: "Massachusetts">, etc. After processing the ingested data 40, 42, a set of normalized, sanitized and disambiguated data 48 is generated for storage and indexing in a data warehouse.

This example illustrates a traditional "personal data" view—which may or may not reflect the actual storage (e.g., personal data table) or data and metadata representation (e.g., associated labels). As can be seen, the first four records from the inputted data set 40 have been converted into four new records in a normalized format, i.e., data from each record has been broken down, analyzed and assigned to a set of meta tags in the data warehouse 48. In particular, for the first record, Record 1, it can be seen that the record has been explicitly broken down into metadata comprising <first name>, <last name>, <street>, <str num>, <City>, and <State>. In addition, implicit metadata tags <Profession> and <Education> are listed with information derived based on the fact that the name includes the salutation of "Dr." Furthermore, a zipcode <Zip> has been derived from other records in the data set 40 that are geo-spatially "nearby." Moreover, the data itself has been altered in places to conform to the data representation rules 47. For instance, "Oak Drive" has been shortened to "Oak Dr," and "Springfield" has been abbreviated to "SPRFLD." In addition, the <first name> data now includes variations Pete, Peter and Pierre. Similar processes have been applied to Records 2 and 3 of data set 40.

In this example, one of the text analytic processes determined that Record 4 included a business entity, as opposed to an individual, based on the fact that the name included "LLC." Thus, "Joes Cleaners" was assigned to the metatag <company name>. Additionally, information regarding the services provided by the company were also derived from the name, e.g., "<services> cleaning/cleaners."

As can be seen, the second data set 42 includes data in a disparate format, namely each record <R1>, <R2>, includes three fields <f1>, <f2>, and <f3>. These two records have been normalized in the data warehouse 48 as Records 5 and 6. Similar to that described above, mining filters 44 assign the inputted data to a set of appropriate metatags, in this case <first name>, <last name>, <DOB>, and <SSN>. In addition, as can be seen, Record 6 includes implicit metadata tags for <Profession> and <Education> based on information derived from the "M.D." salutation. Furthermore, it can be seen that date of birth information in the data warehouse 48 has been converted to a standardized format. Obviously, the example used in FIG. 2 is for illustrative purposes only and is but one of many possible implementations.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. An automated data enhancement processing system for processing database data, comprising a processor and a memory, the memory including:
    a system for ingesting database data structured in at least two disparate predefined database formats used by at least two different database management systems (DBMS),
        wherein the structured data are elements of at least one relational database, the elements representing values of well-defined entities;
    a set of automated text analytics processes that, when applied to the ingested database data, treat the structured ingested database data as unstructured data to generate normalized data described by consistent and structured metadata,
        wherein the set of text analytics processes apply a shared set of metadata tags to the structured database data to describe the normalized data;
    a system for processing the normalized data, wherein the processing includes translating and expanding the normalized data into a consistent structure which is ready for mining and OLAP (online analytical processing) applications; and
    a system for generating mining and OLAP results using the normalized data.

2. The system of claim 1, wherein the set of text analytics processes includes processes for sanitizing, normalizing and disambiguating the ingested data, wherein
    the sanitizing includes identifying and eliminating misspellings, ranges, redundancies, and other errors,
    the normalizing includes converting data to a consistent format, and
    the disambiguating includes eliminating redundancies, anomalies, and polysemi.

3. The system of claim 1, wherein the set of text analytics processes includes processes selected from the group consisting of: translating, people extracting, place extracting, entity type extracting, name tokenizing, organization tokenizing, entity tokenizing, relevancy ranking, polysemi filtering, geo-spatial analyzing, and table/list extracting.

4. The system of claim 1, wherein the set of text analytics processes includes language processes selected from the group consisting of: parts-of-speech tagging, thesaurus matching, and statistical machine translation matching.

5. The system of claim 1, wherein the set of text analytics processes includes polymorphism analysis.

6. The system of claim 1, wherein the normalized data is stored in a data warehouse.

7. A program product stored on a recordable medium, which when executed by a computer, normalizes and processes database data representation and metadata, comprising:
    program code configured for ingesting database data structured in at least two disparate predefined database formats used by at least two different database management systems (DBMS),
        wherein the structured data are elements of at least one relational database, the elements representing values of well-known entities;
    program code providing a set of automated text analytics processes that, when applied to the ingested database data, treat the ingested database data as unstructured data, and generates normalized data described by consistent and structured metadata,
        wherein the set of text analytics processes apply a shared set of metadata tags to describe the normalized data;
    program code for processing the normalized data, wherein the processing includes translating and expanding the normalized data into a consistent structure which is ready for mining and OLAP (online analytical processing) applications; and
    program code for generating mining and OLAP results using the normalized data.

8. The program product of claim 7, wherein the set of text analytics processes includes processes for sanitizing, normalizing and disambiguating the ingested data, wherein
    the sanitizing includes identifying and eliminating misspellings, ranges, redundancies, and other errors,
    the normalizing includes converting data to a consistent format, and
    the disambiguating includes eliminating redundancies, anomalies, and polysemi.

9. The program product of claim 7, wherein the set of text analytics processes includes processes selected from the group consisting of: translating, people extracting, place extracting, entity type extracting, name tokenizing, organization tokenizing, entity tokenizing, relevancy ranking, polysemi filtering, polymorphism analyzing, geo-spatial analyzing, and table/list extracting.

10. The program product of claim 7, wherein the set of text analytics processes includes a natural language processor.

11. The program product of claim 7, wherein the generated normalized data is indexed.

12. The program product of claim 7, further comprising program code configured for storing the normalized data in a data warehouse.

13. A method for normalizing and processing database data, comprising:
    ingesting database data structured in at least two disparate predefined database formats used by at least two different database management systems (DBMS),
        wherein the structured data are elements of at least one relational database, the elements representing values of well-defined entities;

performing a set of automated text analytics processes on the ingested database data to generate normalized data described by a consistent and structured metadata,
wherein each of the text analytics processes treat the ingested database data as unstructured data, and
wherein the set of text analytics processes apply a shared set of metadata tags to describe the normalized data;
processing the normalized data, wherein the processing includes translating and expanding the normalized data into a consistent structure which is ready for mining and OLAP (online analytical processing) applications; and
generating mining and OLAP results using the normalized data.

14. The method of claim 13, wherein the set of text analytics processes includes processes for sanitizing, normalizing and disambiguating the ingested data, wherein
the sanitizing includes addressing identifying and eliminating misspellings, ranges, redundancies, and other errors,
the normalizing includes converting data to a consistent format, and
the disambiguating includes eliminating redundancies, anomalies, and polysemi.

15. The method of claim 13, wherein the set of text analytics processes includes processes selected from the group consisting of: translating, people extracting, place extracting, entity type extracting, name tokenizing, organization tokenizing, entity tokenizing, relevancy ranking, polysemi filtering, polymorphism analyzing, geo-spatial analyzing, and table/list extracting.

16. The method of claim 13, wherein the set of text analytics processes includes a natural language processor.

17. The method of claim 13, wherein the generated normalized data is indexed.

18. The method of claim 13, further comprising the step of storing the normalized data in a data warehouse.

19. A method for deploying an automated data enhancement processing system for normalizing and processing database data, comprising:
providing a computer infrastructure being operable to:
ingest database data structured in at least two disparate predefined database formats used by at least two different database management systems (DBMS),
wherein the structured data are elements of at least one relational database, the elements representing values of well-defined entities;
perform a set of automated text analytics processes on the ingested database data to generate normalized data described by a consistent, indexed and structured metadata,
wherein each of the text analytics processes treat the ingested data as unstructured data, and
wherein the set of text analytics processes apply a shared set of metadata tags to describe the normalized data;
process the normalized data, wherein the processing includes translating and expanding the normalized data into a consistent structure which is ready for mining and OLAP (online analytical processing) applications; and
generate mining and OLAP results using the normalized data.

* * * * *